Oct. 29, 1963 C. E. MITCHELL ETAL 3,109,071

TELEPHONE CALL TRANSMITTER

Filed Dec. 18, 1959 3 Sheets-Sheet 1

INVENTORS C.E. MITCHELL
R.E. PRESCOTT
L. SCHENKER
D.G. TWEED

BY John C. Morris

ATTORNEY

Oct. 29, 1963 C. E. MITCHELL ETAL 3,109,071

TELEPHONE CALL TRANSMITTER

Filed Dec. 18, 1959 3 Sheets-Sheet 2

INVENTORS C. E. MITCHELL
R. E. PRESCOTT
L. SCHENKER
D. G. TWEED

BY John C. Morris

ATTORNEY

INVENTORS C.E. MITCHELL
R.E. PRESCOTT
L. SCHENKER
D.G. TWEED

BY John C Morris
ATTORNEY

United States Patent Office 3,109,071 Patented Oct. 29, 1963

3,109,071
TELEPHONE CALL TRANSMITTER

Clifford E. Mitchell, Warren Township, Somerset County, Robert E. Prescott, Bernardsville, Leo Schenker, Berkeley Heights, and Donald G. Tweed, Maplewood, N.J., assignors to Bell Telephone Laboratories, Incorporated, New York, N. Y., a corporation of New York Filed Dec. 18, 1959, Ser. No. 860,549
4 Claims. (Cl. 179—90)

This invention relates to telephone substation apparatus and more particularly to calling mechanisms therefor.

The several advantages which may be achieved by the use of pushbutton controlled subscriber voice-frequency signaling are pointed out in the Patent 3,076,059, issued January 29, 1963, based on the application of L. A. Meacham, Serial No. 743,434, filed June 20, 1958. Advantages of particular note include more efficient use of transmission facilities along with the reduction of calling time, as compared with a standard rotary dial, by approximately one-half. The latter attribute is extremely attractive since a material saving in telephone central office common equipment is possible. Another further significant advantage is that pushbutton calling has generally received very favorable acceptance by subscribers.

The above-identified Meacham application describes a high reliability dual voice-frequency system for transmission and detection of calling signals in the presence of background interference. That system involves the selection, upon the operation of a single pushbutton, of two signaling frequencies followed by the enabling of a transistor oscillator powered over the telephone line, and the generation and transmission of the dual frequencies to the central office for detection and registration of the digit.

In Patent 3,035,211 of the joint inventor, C. E. Mitchell, issued May 15, 1962, based on application Serial No. 768,737, filed October 21, 1958, a mechanism which provides the necessary functions of selection of the pair of frequencies followed by the subsequent enablement is disclosed. In that connection the desirablility of arranging the pushbuttons in a rectangular array with a pair of matrices made up of conductors with switch points beneath each pushbutton is disclosed. A common operator for all of the pushbuttons operates a transfer switch, thereby allowing these subsequent switching operations to be performed. The dual matrix arrangement proposed in the Mitchell application employing the printed circuit techniques has proved successful. It is recognized, however, that the large number of contacts necessitated by such an arrangement, that is, two pairs of contacts beneath each pushbutton plus the transfer contacts in a mechanism offers a very real problem of switch contact reliability. The failure of any one of the more than twenty contacts would render the calling mechanism inoperative.

With this state of the prior art in mind, it is a general object of this invention to improve pushbutton call transmitters.

A more specific object is to provide improved reliability, lower cost and smaller size pushbutton call transmitters.

It is a further object of this invention to achieve the general objectives while retaining the desirable characteristics of the matrix arrangement for the moving elements of the call transmitter.

These objects are all achieved in accordance with this invention, one embodiment of which comprises a frame and an overlying cover having a plurality of openings therethrough and a pushbutton mounted for movement perpendicular to the frame and the cover in each of the openings in the cover. The pushbuttons are arranged in three columns of four buttons. Adjacent to each row and adjacent to each column of pushbuttons are individual formed wire elements each journaled for rotation through an arc. The formed elements all include U-shaped bends which extend underneath the adjacent pushbuttons. Thus, the depression of any pushbutton causes the simultaneous rotation of the associated row and column wire elements. At one end of each row and column are single integral spring members including a spring finger arranged to be depressed by the wire element as it is rotated by a pushbutton. Beneath each finger is a relatively fixed contact completing the necessary elements for a series of pushbutton controlled switches. In the region between the cover and the frame are secured a plurality of electrical components and on the opposite face of the frame are more components all interconnected in the calling oscillator circuit.

In another embodiment of this invention, the formed elements operated by the pushbuttons are replaced by the rockable plates with one plate associated with two adjacent rows for displacement in one direction upon the depression of a pushbutton in one row and rotation in the opposite direction upon depression of a pushbutton in the adjacent row. The end of the plate is positioned for closing one or the other of a pair of contacts depending upon which direction it is pivoted or in other words in which row the pushbutton is located.

One feature of this invention relates to the arrangement of a plurality of mechanical operator members adjacent to the rows and columns of a pushbutton array for the closing of two sets of contacts, one associated with the proper column and one with the proper row for the selected pushbutton.

Another feature of this invention relates to the utilization of a single pair of contacts for an entire row or column in a pushbutton array.

One other feature of this invention relates to the coupling of all operators in a row or column to actuate a common switch.

Still another feature of this invention involves the dual use of the frame of the calling mechanism for supporting the mechanical elements associated with the pushbuttons, the electrical components making up the circuitry controlled by the pushbuttons and the interconnecting printed circuitry itself and providing the insulating medium for electrical isolation of rods, contacts, component leads, and printed wiring conductors.

These and other features of this invention may be more clearly understood from the following detailed description and by reference to the accompanying drawings wherein.

Figure 1:
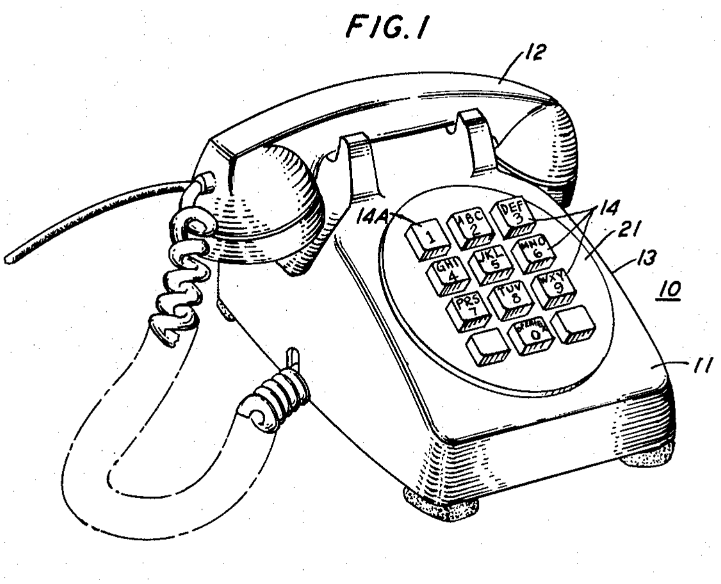
FIG. 1 is a perspective showing of a telephone instrument embodying the call transmitter of the present invention.

In FIG. 1, the telephone set 10 includes a base 11, handset 12, and a call transmitter 13 of this invention employing a plurality of pushbuttons 14 arranged in three columns of four pushbuttons each. The usual designation found in a rotary dial appears on ten of the pushbuttons while the two additional pushbuttons found in the lower corners of the array are unlabeled and available for additional services which may be offered. The speech and ringing aspects of the telephone set 10 are preferably of the standard type while the call transmitter employs the concepts of the multifrequency signaling system described in the L. A. Meacham et al. patent application identified above.

Figure 2:
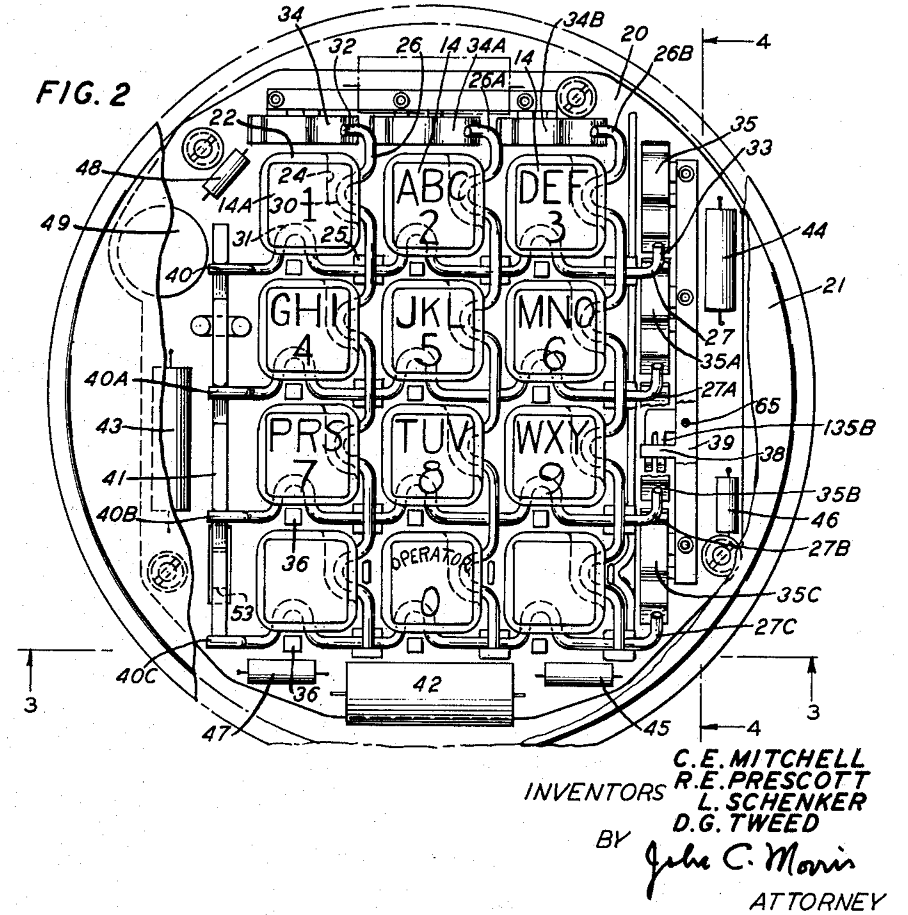
FIG. 2 is a plan view of the call transmitter of the present invention wtih the cover broken away to show the greater portion of the interior.

In FIG. 2 the call transmitter of the telephone set 10 of FIG. 1 may be seen as including a frame 20 and a cover 21 which is largely broken away in order to show the details of the mechanism. The pushbuttons 14, of which the "1" digit button 14A is typical, are largely cubical in shape, having a flange 22 to limit the outward travel and a return spring 58 (see FIG. 3) which maintains the pushbutton in an elevated position. The pushbutton has a planar lower surface with a cut-out 24 in one corner. The frame includes pillars 25 at the intersection between several rows and columns of pushbuttons. The pillars are of dielectric material with transverse slots forming journals for formed elements 26, 26A, and 26B and 27, 27A, 27B and 27C.

Figure 3:
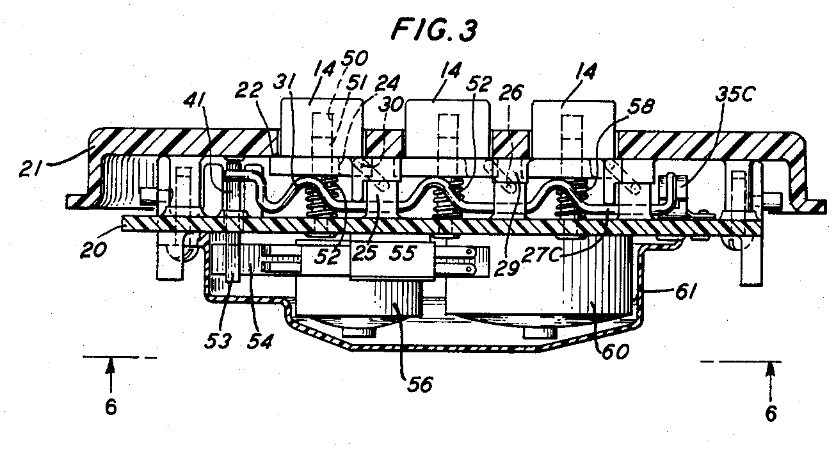
FIG. 3 is a front view of the call transmitter of FIG. 2, in section along the line 3—3 of FIG. 2.

The outermost pillars 25 are used as bearings and the remaining pillars have enlarged slots so as to act only as deflection limits and not bearings. This avoids the possibility of binding in intermediate bearings. The formed elements 26 are journaled at a higher level on the pillars and insulated from the formed elements 27. All are trapped in their respective bearings and slots by extensions 29 on the underside of the cover, as shown in FIG. 3. The elements 26 all include hairpin bends 30 in the region of the cut-outs 24. The lower surface of the cut-out 24 is in the position so that upon depression of the pushbutton the bottom of the cut-out bears against the hairpin bend 30 and rotates the formed element 26. The typical formed element 27 likewise includes a hairpin bend 31 positioned beneath the planar undersurface of the pushbutton 14A so that upon depression of the pushbutton element 27 likewise is rotated. One end of each of the formed elements 26 and 27 includes a bend 32 or 33, respectively positioned over spring fingers 34, 34A or 34B, or over spring fingers 35, 35A, 35B or 35C. The formed elements are operative to depress these springs fingers and make contact with lower spring contacts 134 (A, B) and 135 (A, B, C) which are hidden beneath the spring fingers 34 (A, B) and 35 (A, B, C) but may be seen in FIGS. 4 and 5.

It should be noted that the depression of each pushbutton rotates one transverse and one longitudinal formed element and thereby effects the depression of one spring finger 34 and one finger 35, thereby providing the same switching function as has heretofore been achieved by the placement of the multitude of spring elements directly beneath the pushbutton. It should also be noted that the formed elements 27, 27A, 27B and 27C each additionally includes an offset operating arm 40, 40A, 40B and 40C, respectively, which bears against a slide member 41 positioned for longitudinal movement parallel to the columns of pushbuttons. Therefore, on the depression of a single pushbutton, one pair of column contacts and one pair of row contacts close and the slide member 41 is moved so as to operate the transfer switch 55 described below in connection with FIG. 6.

In the spaces between the frame and housing surrounding the rectangular array of pushbuttons and switch contacts are a plurality of components including capacitors 42, 43 and 44, resistors 45, 46, 47 and 48 and transistor 49. These components are secured to the frame with leads extending therethrough and also positioned beneath the cover thereby fully utilizing this volume.

The relative positioning of the frame and cover may be clearly seen in FIG. 3. The pushbuttons 14 are all shown in their normal at-rest position with the flange 22 bearing against the underside of the cover 21. Each pushbutton has a cylindrical cavity 50 in the underside and the frame mounts an upstanding stud 51 extending into the cavity and surrounded, on its portion below the pushbutton, by a return spring 52. The relative positioning of the formed elements 26 and 27 journaled in the pillars 25 may be seen and their normal position more clearly understood in FIG. 3. The hairpin bend 30 of the formed element 26 bears against the cut-out 24 on the underside of the pushbutton 14A and the hairpin bend 31 of the formed element 27 similarly bears against the underside of the pushbutton 14A. Electrical isolation between elements 26 and 27 is maintained by being spaced in the insulating pillar, as shown. The slide member 41 may be seen as extending through the frame 20 and having a tab 53 bearing against the operating element 54 of the transfer switch 55 similarly secured to the underside of the frame 20. On this same side of the frame 20 are two inductive elements 56 and 60. The transfer switch and inductive elements are enclosed within a dust cover 61 which may be of transparent plastic material.

Figure 4:
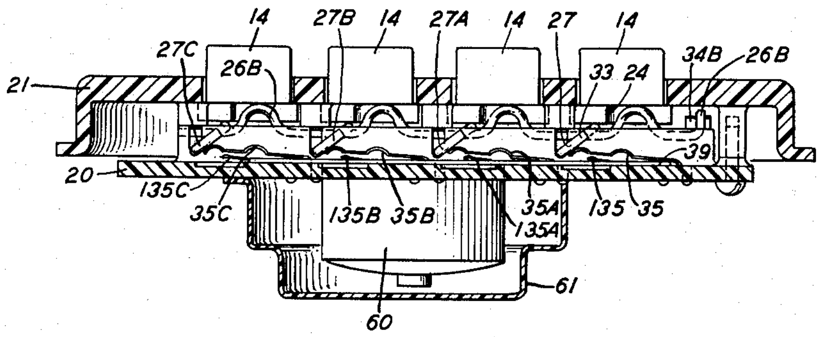
FIG. 4 is a side elevation of the call transmitter of FIG. 2, in section along the line 4—4 of FIG. 2.

FIG. 4 is a sectional view along one of the columns of pushbuttons also shown in the at-rest or unoperated position. This section, taken along the line 4—4 of FIG. 2, shows additionally the spring fingers 35, 35A, 35B and 35C which constitute one of each of the pairs of contacts for all of the rows of pushbuttons. The mating contacts 135, 135A, 135B and 135C positioned beneath the moving contacts may be seen in FIG. 4 and at the right center of FIG. 2 where a portion of spring finger 35B is broken away. The lower mating contacts 134 and 135 are bifurcated to improved reliability. The end bends 33 of the formed elements 27 bear against contacts 35, 35A, 35B and 35C in this position. Locator studs 36, molded integrally with the frame within a U-bend of each rod serve to restrain the rods from axial movement.

Figure 5:
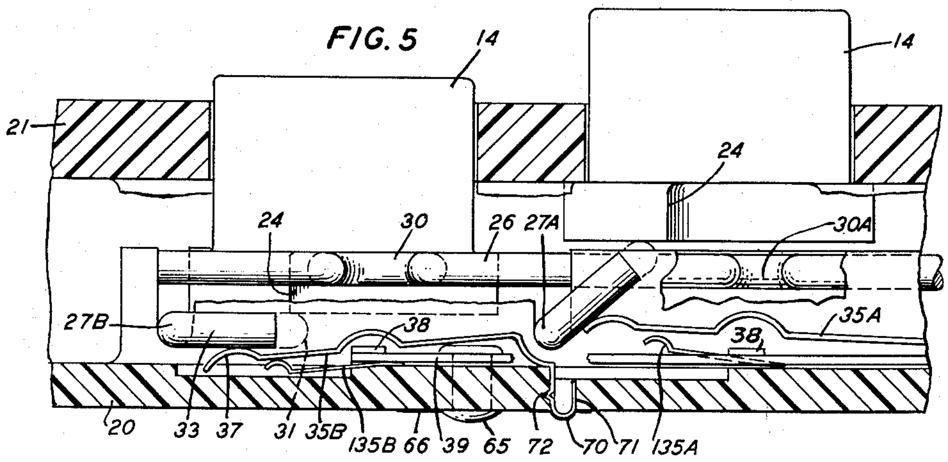
FIG. 5 is an enlarged fragment of the view shown in FIG. 4, modified to show one pushbutton in operated position and one in unoperated position.
Figure 6:
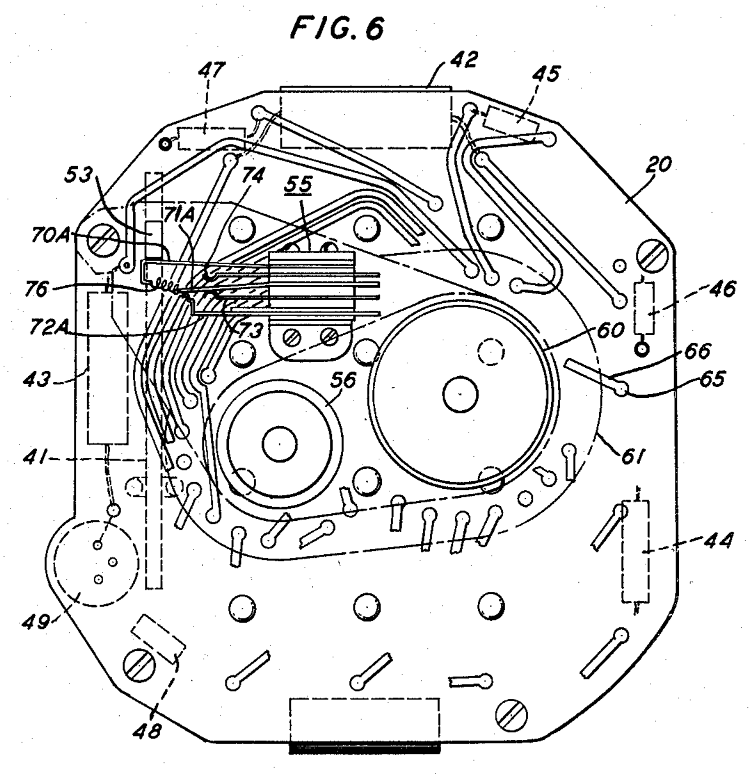
FIG. 6 is a bottom view of the same call transmitter with the cover removed and with certain of the printed conductors omitted for the sake of clarity.

The operation of the switch elements may most readily be seen in FIG. 5 which is an enlarged showing of a pair of adjacent buttons 14 and 14A with one depressed and the other unoperated. The button 14 which has been operated has moved both the hairpin bends 30 and 31 to the horizontal position whereby the formed element 26 is rotated approximately thirty degrees and operates the switch associated with that element but unshown in the drawing. The end bend 33 of element 27, upon rotation, has moved the spring finger 35B until it strikes the contact 135B. The contact 135B is an integral finger of a multifingered spring most clearly seen in FIG. 2 secured to the frame 20 and electrically common with the spring fingers 135, 135A and 135C. The multifingered spring assembly is riveted to the frame 20. The rivet head 65 constitutes electrical connection between the contact 135B and printed circuit conductor 66 on the bottom side of the frame 20, as is shown in FIG. 6.

The spring contact assemblies are all typified by the ones 35B and 135B. The individual contact 35B includes an end boss 37 contacting the angle bend 33 and an intermediate boss to provide clearance over a tang 38 in a bar 39 extending along the length of all of the lower contacts 135, 135A, 135B, 135C and securing them to the frame 20 by rivets 65. The fixed end of the contact 35B includes a U-shaped bend 70 wedged in a slot 71 in the frame 20 and partially extending through to the opposite surface of the frame 20. The contact 35B is secured to the frame 20 not only by the wedging action of the U-shaped bend 70 in the slot 71 but also by the frictional engagement of an integral tooth 72 imbedded in the frame. Electrical contact is made to each member 34, 35, at the point where the bends 70 extend below the frame 20, by means of printed circuitry (not shown) which may be in the form of dipped solder, which also provides additional mechanical support for these members.

The contacts 135 are normally pretensioned against the tang 38 in the position shown for contact 135A. The mating surfaces of the respective contacts are gold-plated and the arrangement of pretensioning of the contacts 135 affords a high degree of reliability in operation. The pretensioning itself allows a rapid build-up of the operating force after the contacts 35 strike their mating contacts 135 and further insures that these pairs of contacts close prior to the operation of the transfer switch as described above.

The contacts 35A and 135A associated with pushbutton 14A remain open since the rod 27A has not been rotated. The rotation of element 26 has moved the hairpin bend 30A from beneath the pushbutton 14A as indicated by the dot-dash lines.

The individual springs 34 and 35 also supply the restoring force to rotate the members 26 and 27, respectively to their rest positions after an operated pushbutton is released. The primary mechanical elements in the mechanism are the formed elements 26 and 27 which, as may readily be seen, are actually lengths of rod or wire inthe order of .062 inch in diameter which have been formed with the integral hairpin bends, a simple manufacturing step. Additionally, the contacts employed in this mechanism, as compared with the prior art, are reduced in number and the common contacts of both the column and row array are unitary elements having a plurality of spring fingers.

The utilization of the frame member to the utmost is further illustrated in FIG. 6 showing the underside of the call transmitter without the cover 61. Fragments of the printed circuitry 66 connected with rivet heads 65 for the multifingered contacts 134 and 135 of FIG. 5 are visible. Likewise, the conductors interconnecting certain of the capacitors and resistors may be seen.

Where heretofore the frame was devoted primarily to carrying the longitudinal conductors forming the dual matrices, the use of the formed operators and minimum number of switches in a rectangular array frees the greater area of the frame for use in carrying the electrical connectors between the components of the circuitry. This combination of improved switching mechanism and more efficient utilization of the frame results in a substantial reduction of overall volume of the call transmitter as well.

The details of the transfer switch also appear in FIG. 6. The slide member 41, longitudinally movable in a slot in the frame includes the tab 53 bearing against the operator 70 of transfer switch 55. The transfer switch is of well known design including armature 71A, a pair of back contacts 72A and 73, and a front contact 74. The operator 70A and armature 71A are connected by a helical spring 76 providing a rapid snap action which is desirable to provide both the proper operation of the pushbutton and rapid excitation of the oscillator.

Figure 7:
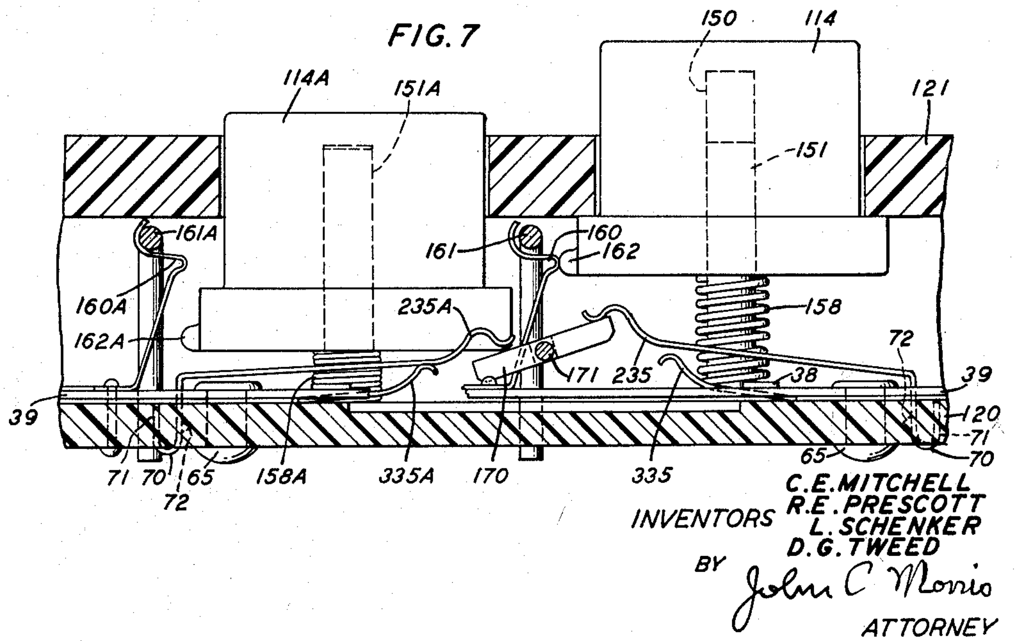
FIG. 7 is an enlarged side view in section of a fragment of an alternative form of call transmitter using rocking plates, the section being taken in a position and direction analogous to that of FIG. 4.

In FIG. 7 another embodiment of this invention may be seen. This figure is an enlarged fragmentary vertical section of a call transmitter showing an unoperated pushbutton 114 and an operated pushbutton 114A extending through cover 121 and moving on studs 151 secured to a frame 120. As in the previous embodiment, the studs 151 extend into cavities 150 and the pushbuttons 114 and 114A are normally maintained in their unoperated position by return springs 158 and 158A. Two forms of contacts are disclosed in this embodiment. One is an upright spring element 160, the end of which is arranged to be pretensioned into contact with a wire bus 161 extending parallel to the rows of pushbuttons. A projection 162 on each pushbutton bears against the spring element 160 to hold the contact open until the button is depressed. Each pushbutton has one finger of a multifingered element 160 or 160A contacting a bus 161 or 161A. Positioned between the two adjacent rows of pushbuttons is a rockable plate 170 pivoted about an axis 171 which extends parallel to the rows of pushbuttons. Contact springs 235 and 235A of the same configuration as the spring elements 35 and 35A of FIG. 2 are arranged with free ends opposing and extending over the near edge of the rockable plate 170 and pretensioned against it. The contacts 335 and 335A are positioned beneath contacts 235 and 235A, respectively.

In the position shown, pushbutton 114A has been operated and the projection 162A has released spring element 160A and allowed it to contact bus 161A, thereby closing one pair of contacts. The pushbutton 114A also has tipped the rockable plate 170, allowing pretensioned contact 235A to drop into contact with element 335A, closing the circuit between the contacts 235A and 335A. As pushbutton 114 is released, the rockable plate 170 returns to intermediate position with no switches closed. This embodiment has the advantage of reducing the number of mechanical elements since one rockable plate takes the place of a pair of formed wire elements as shown in FIG. 2. A common transfer switch similar to switch 55 of FIG. 6 may be coupled to the rocking plate 170, for example, by a pair of cams at one end of the plate to operate a slider similar to element 53 of FIG. 3. Although in this embodiment there is a pair of contacts for each pushbutton, an additional array of rockable plates may be arranged as well between adjacent columns of pushbuttons. The present form, however, is preferred in that it reduces the overall volume of the assembly.

In all cases it is understood that the above-described arrangements are merely illustrative of the principles of the invention. Numerous and varied other embodiments may be devised in accordance with these principles by those skilled in the art without departing from the spirit and scope of the invention.

What is claimed is:

1. A telephone substation calling mechanism comprising a frame, a guide plate overlying and spaced from said frame and including a plurality of apertures arranged in rows and columns, a pushbutton mounted for movement in each aperture, an array of elongated members in columns extending parallel to the columns of apertures and positioned between said frame and guide plate, an array of elongated members in rows extending parallel to the rows of apertures and positioned between said frame and guide plate, each of said elongated members including a plurality of projections one each extending into the path of travel of a pushbutton in a respective row or column, means mounting said elongated members for arcuate movement around an axis generally parallel to a respective row or column, switches, and means coupling a switch to each elongated member for operation upon the arcuate movement thereof.

2. A telephone substation calling mechanism comprising a frame, a plate overlying and spaced from said frame and including a plurality of apertures arranged in rows and columns, a pushbutton mounted for movement in each aperture, an array of elongated members in columns extending parallel to the columns of apertures and positioned between said frame and plate, an array of elongated members in rows extending parallel to the rows of apertures and positioned between said frame and plate, each of said elongated members including a plurality of projections one each extending into the path of travel of a pushbutton in a respective row or column, means mounting said elongated members for arcuate movement around an axis generally parallel to a respective row or column upon the operation of a pushbutton and displacement of the projections on one row elongated member and one column elongated member, switches, and means coupling a switch to each elongated member for operation upon the arcuate movement thereof.

3. A telephone substation calling mechanism comprising a frame, a plate overlying and spaced from said frame and including a plurality of apertures arranged in rows and columns, a pushbutton mounted for movement in each aperture, an array of elongated members in columns extending parallel to the columns of apertures and positioned between said frame and plate, an array of elongated members in rows extending parallel to the rows of apertures and positioned between said frame and plate, each of said elongated members including a plurality of projections one each extending into the path of travel of a pushbutton in a respective row or column, means mounting said elongated members for arcuate movement around an axis generally parallel to a respective row or column, a plurality of switches positioned along respective elongated members, and means coupling said switches to the adjacent elongated member for operation upon the arcuate movement thereof.

4. A pushbutton mechanism comprising a plurality of pushbuttons arranged in a series of columns, a plurality of first switch operators, each first switch operator underlying an individual column of pushbuttons and being displaceable by the depression of any button in the column, a plurality of second switch operators extending transversely to the plurality of first operators, each second switch operator underlying a single pushbutton in each column and being displaceable by the depression of any pushbutton beneath which it extends, a single switch associated with each first and with each second switch operator and located in juxtaposition with an extremity thereof, the switch associated with each switch operator being actuable by the displacement of the operator, whereby the depression of any pushbutton results in the actuation of a unique pair of switches, and a common switch coupled to one of said plurality of switch operators and operable by any one of them.

References Cited in the file of this patent

UNITED STATES PATENTS

| | | |
|---|---|---|
| 2,107,158 | Lewis | Feb. 1, 1938 |
| 2,428,016 | Deakin | Sept. 30, 1947 |
| 2,927,971 | Busala | Mar. 8, 1960 |
| 2,969,439 | Dubois | Jan. 24, 1961 |